United States Patent [19]

Maxon

[11] Patent Number: 5,698,484
[45] Date of Patent: Dec. 16, 1997

[54] METHOD AND CONTAINMENT VESSEL FOR PRODUCING FUSED SILICA GLASS AND THE FUSED SILICA BLANK PRODUCED

[75] Inventor: John E. Maxon, Canton, N.Y.

[73] Assignee: Corning Incorporated, Corning, N.Y.

[21] Appl. No.: 712,296

[22] Filed: Sep. 11, 1996

Related U.S. Application Data

[60] Provisional application No. 60/003,608 Sep. 12, 1995.
[51] Int. Cl.$^6$ ................................................. C03B 20/00
[52] U.S. Cl. .................... 501/54; 65/17.3; 65/17.4; 65/144; 65/413; 65/416; 65/DIG. 8; 501/900
[58] Field of Search ..................... 65/17.4, 144, 413, 65/414, 416, 950, DIG. 8, 399, 17.3; 501/54, 900; 359/350, 900

[56] References Cited

U.S. PATENT DOCUMENTS

| | | |
|---|---|---|
| 3,806,570 | 4/1974 | Flamenbaum et al. . |
| 3,859,073 | 1/1975 | Schultz . |
| 3,930,819 | 1/1976 | Martin ................................ 65/25.1 |
| 3,966,446 | 6/1976 | Miller . |
| 4,017,288 | 4/1977 | French et al. . |
| 4,065,280 | 12/1977 | Kao et al. ............................. 65/413 |
| 4,135,901 | 1/1979 | Fujiwara et al. . |
| 4,203,744 | 5/1980 | Schultz et al. . |
| 4,231,774 | 11/1980 | Maklad ................................ 65/413 |
| 4,263,031 | 4/1981 | Schultz . |
| 4,265,649 | 5/1981 | Achener . |
| 4,363,647 | 12/1982 | Bachman et al. ..................... 65/17.4 |
| 4,568,370 | 2/1986 | Powers . |

(List continued on next page.)

FOREIGN PATENT DOCUMENTS

| | | |
|---|---|---|
| 4-12032 | 1/1992 | Japan . |
| 5-97452 | 4/1993 | Japan . |
| 5-116969 | 5/1993 | Japan . |
| 6-166527 | 7/1994 | Japan . |
| 6-234530 | 8/1994 | Japan . |
| 6-234531 | 8/1994 | Japan . |
| 6-308717 | 11/1994 | Japan . |
| WO 93/00307 | 1/1993 | WIPO . |

OTHER PUBLICATIONS

Translation of Japanese Patent Publication No. 4–12032 (Jul. 1992).
Pfau et al., *Applied Optics*, vol. 31, No. 31, pp. 6658–6661 (Nov. 1, 1992).
Translation of Pat. No. 5–97452 (JP Apr. 1993), Item #16 above.
Translation of Pat. No. 5–116969 (JP May 1993), Item #16 above.
Translation of Pat. No. 6–166527 (JP Jul. 1994) Item #17 above.
Translation of Pat. No. 6–234530 (JP Aug. 1994), Item #18 above.
Translation of Pat. No. 6–234531 (JP Aug. 1994), Item #19 above.
Translation of Pat. No. 6–308717 (JP Nov. 1994), Item #20 above.

*Primary Examiner*—Donald E. Czaja
*Assistant Examiner*—Sean Vincent
*Attorney, Agent, or Firm*—Maurice Klee

[57] ABSTRACT

Fused silica boules (19) having improved homogeneity are produced by causing the boule (19) to flow radially during its formation to achieve local mixing between portions of the boule which may have experienced different laydown conditions. The mixing is achieved by one or a combination of: (1) use of a containment vessel (13) having a gently sloping containment wall (22); (2) use of a containment vessel (13) whose inner radius ($r_v$) is substantially larger than the outermost radius ($r_b$) of the burners (14) used to produce the boule (19); and/or (3) maintaining the boule (19) at a sufficiently high temperature during laydown so that radial flow is achieved with a minimum head height of glass. Large blanks having high homogeneity can be made from such boules, e.g., blanks having diameters above 200 millimeters and Δn values of less than $0.25 \times 10^{-6}$.

30 Claims, 4 Drawing Sheets

U.S. PATENT DOCUMENTS

| | | | |
|---|---|---|---|
| 4,935,046 | 6/1990 | Uchikawa et al. | 65/17.4 |
| 4,978,379 | 12/1990 | Sawada et al. | 65/17.4 |
| 5,043,002 | 8/1991 | Dobbins et al. | 65/413 X |
| 5,049,175 | 9/1991 | Ross et al. | 65/427 |
| 5,086,352 | 2/1992 | Yamagata et al. | 359/350 |
| 5,152,819 | 10/1992 | Blackwell et al. | 65/900 X |
| 5,221,309 | 6/1993 | Kyoto et al. | |
| 5,364,430 | 11/1994 | Sarkar . | |
| 5,364,433 | 11/1994 | Nishimura et al. | |
| 5,395,413 | 3/1995 | Sempolinski et al. | |
| 5,401,290 | 3/1995 | Akaike . | |
| 5,410,428 | 4/1995 | Yamagata et al. | |
| 5,523,266 | 6/1996 | Nishimura et al. | |
| 5,556,442 | 9/1996 | Kanamori et al. | |

| | |
|---|---|
| PV | 0.0200 WAVES |
| RMS | 0.0033 WAVES |
| Δn | 0.24 x 10⁻⁶ |
| THICKNESS | 2.003" (5.09cm) |
| APERTURE | 8.5" (21.5cm) |
| λ | 632.8nm |

METHOD AND CONTAINMENT VESSEL FOR PRODUCING FUSED SILICA GLASS AND THE FUSED SILICA BLANK PRODUCED

CROSS REFERENCE TO RELATED PROVISIONAL APPLICATION

This application claims the benefit under 35 USC §119(e) of U.S. Provisional Application Ser. No. 60/003,608 filed Sep. 12, 1995.

FIELD OF THE INVENTION

This invention relates to the production of fused silica glass and, in particular, to methods and apparatus for improving the homogeneity of such glass, i.e., for reducing variations in the index of refraction of the glass.

DESCRIPTION OF THE TECHNOLOGY

FIG. 1 shows a prior art furnace 10 for producing fused silica glass. In overview, silicon-containing gas molecules are reacted in a flame to form $SiO_2$ soot particles. These particles are deposited on the hot surface of a rotating body where they consolidate into a very viscous fluid which is later cooled to the glassy (solid) state. In the art, glass making procedures of this type are known as vapor phase hydrolysis/oxidation processes or simply as flame hydrolysis processes. The body formed by the deposited particles is often referred to as a "boule" and this terminology is used herein, it being understood that the term includes any silica-containing body formed by a flame hydrolysis process.

Furnace 10 includes a crown 12 having multiple deposition burners 14, a ring wall 16 which supports the crown, and a rotatable base 18 mounted on a x-y oscillation table 20. The crown, ring wall, and base are each made of refractory materials. Preferred patterns for the motion of the x-y oscillation table 20, which can be used in the practice of the present invention, are described in commonly assigned U.S. patent application Ser. No. 60/003,596, entitled "Boule Oscillation Patterns for Producing Fused Silica Glass", which was filed on Sep. 12, 1995 in the name of John E. Maxon.

Refractory blocks 22 are mounted on base 18 to form containment vessel 13. The blocks form the vessel's containment wall and the portion of base 18 surrounded by the wall (the bottom of the vessel) is covered with high purity bait sand 24 which collects the initial soot particles. The space between the top of the vessel and the crown (i.e., plenum 26) is vented by a plurality of vents 28 formed at the top of ring wall 16 at its junction with the crown. The vents are connected to a suitable exhaust system by ducting which creates a negative pressure in the plenum. The negative pressure causes air to flow upward through annular gap 30 between the ring wall and the containment vessel. A furnace system which controls for variations in the air flow around the containment vessel and which can be used in the practice of the present invention is described in commonly assigned U.S. patent application Ser. No. 60/003,595, entitled "Furnace for Producing Fused Silica Glass", which was filed on Sep. 12, 1995 in the name of Paul M. Schermerhorn.

Refractory blocks 22 can be composed of an outer alumina base block 22a and an inner liner 22b made of, for example, zirconia or zircon. Other refractory materials and constructions can, of course, be used if desired. To insure that the liner would not fall inward into boule 19, in the prior art, the inner surfaces of the base blocks were cut at an angle of about 10° (i.e., a range from about 10° to up to about 15°) with respect to vertical, as shown in FIG. 1. This 10° angle corresponds to a rate of change in the height of the containment wall with increasing distance from the center of the vessel of greater than 5.5 (greater than 3.5 for 15°), i.e., for every millimeter outward, the surface of the containment wall goes upward by more than 5.5 millimeters (by more than 3.5 millimeters for 15°). As also shown in FIG. 1, in the prior art, the inner radius $r_v$ of the bottom of the containment vessel was substantially equal to the radius $r_b$ of the outermost of the deposition burners 14.

As practiced commercially, boules having diameters on the order of five feet (1.5 meters) and thicknesses on the order of 5–8 inches (13–20 cm) can be produced using furnaces of the type shown in FIG. 1. Multiple blanks are cut from such boules and used to make various products, including optical elements, such as, lenses (including lenses for microlithography systems), prisms, and the like. The blanks are generally cut in a direction parallel to the axis of rotation of the boule in furnace 10, and the optical axis of a lens element made from such a blank will also generally be parallel to the boule's axis of rotation. For ease of reference, this direction will be referred to herein as the "z-direction" or the "z-axis."

The amount of variation in the index of refraction of a blank which can be tolerated depends on the product which is to be made from the blank. Homogeneity of a blank or optical element is normally measured using interferometric techniques. When large parts are to be made, a large aperture interferometer is used, e.g., an interferometer having an aperture of 18 inches (46 cm).

FIG. 2 shows an 18-inch (46 cm) interferometer plot (phase plot) for a fused silica boule prepared in accordance with the present invention. The boule was prepared using (1) a furnace of the type shown in FIG. 1, (2) a containment vessel whose inner walls were sloped at an angle of 30° with respect to vertical, and (3) the oscillation pattern referred to as "process 1" in the above-referenced application entitled "Boule Oscillation Patterns for Producing Fused Silica Glass."

Quantitatively, the z-direction homogeneity of a blank is expressed as its $\Delta n$ value, which is calculated from the interferometer plot using the equation:

$$\Delta n = (\lambda \cdot PV)/t_b, \qquad (1)$$

where $\lambda$ is the wavelength of light used by the interferometer, PV is the difference between the highest peak and the lowest valley of the phase plot, and $t_b$ is the thickness of the blank. The homogeneity of a blank can also be expressed in other ways, such as in terms of the root-mean-square (RMS) deviation of the phase plot, which provides a measure of the variations in n between different points of the blank. See, for example, Japanese Patent Application Disclosure No. 6-308717, published Nov. 4, 1994.

An application for fused silica blanks which requires very low values of $\Delta n$ (e.g., $\Delta n$ values less than or equal to $1.0 \times 10^{-6}$ and preferably less than or equal to $0.5 \times 10^{-6}$ for blanks having a diameter of 125 mm and larger) is in the production of optical elements for microlithography systems.

Microlithography systems are used to produce integrated circuits and generally include a deep UV laser light source, an illumination lens system, and a projection (imaging) lens system. See, for example, Pfau et al., "Quartz inhomogeneity effects in diffraction-limited deep ultraviolet imaging," *Applied Optics*, Vol. 31, No. 31, pages 6658–6661 (Nov. 1, 1992). The illumination lens system expands the laser beam and homogenizes its intensity. The projection lens system projects a very high resolution image of a mask onto a resist-covered IC wafer.

Diffraction effects limit the line width produced at the IC wafer and thus limit the density of circuits which can be written onto the wafer. In particular, the resolution (R) at the wafer is given by:

$$R = K \cdot \lambda_L / NA, \qquad (2)$$

where K is a constant whose value depends on the particular system and process used, $\lambda_L$ is the operating wavelength of the laser light source, and NA is the numerical aperture of the projection lens system.

Reducing the wavelength of the laser light thus improves the resolution and allows narrower lines to be written on the wafer. Accordingly, in recent years, shorter wavelength lasers, e.g., lasers having a wavelength of 400 nm or less, have come into use in microlithography systems. Examples of such lasers include KrF and ArF excimer lasers which operate at 248 nm and 193 nm, respectively.

At these short (UV) wavelengths, standard optical glasses cannot be used for the optical elements of the system because of their high absorption. Fused silica glass, on the other hand, is transparent in the UV range and has thus become the material of choice for this application.

Because the goal of a microlithography system is to produce an image having a resolution in the submicron range, the lens elements used in such a system, and thus the lens blanks used to produce the lens elements, must be of the highest quality. Among other properties, such lens blanks must have high internal transmission values, e.g., above about 99.8%±0.1% per centimeter, low levels of inclusions, low birefringence, and low fluorescence, and high resistance to laser damage at UV wavelengths.

Of critical importance is the blank's $\Delta n$ value since uncontrolled variations in n manifest themselves as uncorrectable aberrations in the image produced at the IC wafer. Moreover, from equation (2) above, to achieve high resolution, large NA values are needed. Large NA values, in turn, mean large lens elements. Accordingly, not only must $\Delta n$ be small, it must be small for large blank sizes.

Various efforts have been made to achieve this combination of a low $\Delta n$ value and a large blank size. See, for example, Yamagata et al., U.S. Pat. No. 5,086,352, PCT Publication No. WO 93/00307 published Jan. 7, 1993, Japanese Patent Application Disclosure No. 5-97452 published Apr. 20, 1993, Japanese Patent Application Disclosure No. 5-116969 published May 14, 1993, Japanese Patent Application Disclosure No. 6-166527 published Jul. 14, 1994, Japanese Patent Application Disclosure No. 6-234530 published Aug. 23, 1994, and Japanese Patent Application Disclosure No. 6-234531 published Aug. 23, 1994. Notwithstanding these efforts, a need still exists for improvements in this area. The present invention is addressed to this need.

SUMMARY OF THE INVENTION

In view of the foregoing, it is an object of this invention to provide improved methods and apparatus for producing silica-containing boules by the flame hydrolysis process. In particular, it is an object of the invention to improve the homogeneity of such boules and thus the homogeneity of blanks and optical elements made therefrom. It is a further object of the invention to provide blanks and optical elements which have both a high homogeneity and a large size.

In accordance with the invention, it has been discovered that the homogeneity of a boule, and thus the homogeneity of blanks and optical elements made therefrom, can be significantly improved by causing the boule to undergo sufficient radial flow during its formation so as to achieve at least some mixing of different portions of the boule which may have experienced different laydown conditions during the formation of the boule, e.g., different amounts of $SiO_2$ deposition, different deposition temperatures, different air flows in the plenum, etc.

The required radial flow is achieved by one or a combination of the following:

(1) maintaining a sufficiently high boule temperature during the boule formation process so that the boule will flow radially under its own weight with a minimum of head height, specifically, with a head height less than or equal to about 5.0 mm and preferably less than or equal to about 0.125 inches (3.2 mm) of glass;

(2) forming the boule in a containment vessel whose inner radius $r_v$ is substantially larger than the radius $r_b$ of the outermost of the deposition burners used to form the boule, e.g., the ratio of $r_v$ to $r_b$ is at least about 1.1; and/or (3) forming the boule in a containment vessel having an inner containment wall or walls whose vertical height h increases with increasing distance d from the center of the vessel at a rate $\Delta h/\Delta d$ which is less than or equal to about 3.

Preferably, all three approaches for obtaining radial flow are used in combination.

By means of the invention, blanks and optical elements can be produced having homogeneity values ($\Delta n$ values) less than or equal to $1.0 \times 10^{-6}$, preferably less than or equal to $0.5 \times 10^{-6}$, and most preferably less than or equal to $0.25 \times 10^{-6}$ for blank (element) sizes (e.g., diameters for cylindrical blanks) greater than or equal to 125 mm, preferably greater than or equal to 150 and most preferably greater than or equal to 200 mm. Depending upon the capabilities of the testing equipment used, satisfaction of the $\Delta n$ criterium can be determined by testing the blank or element as a whole or by testing representative sections thereof.

Figure 2:
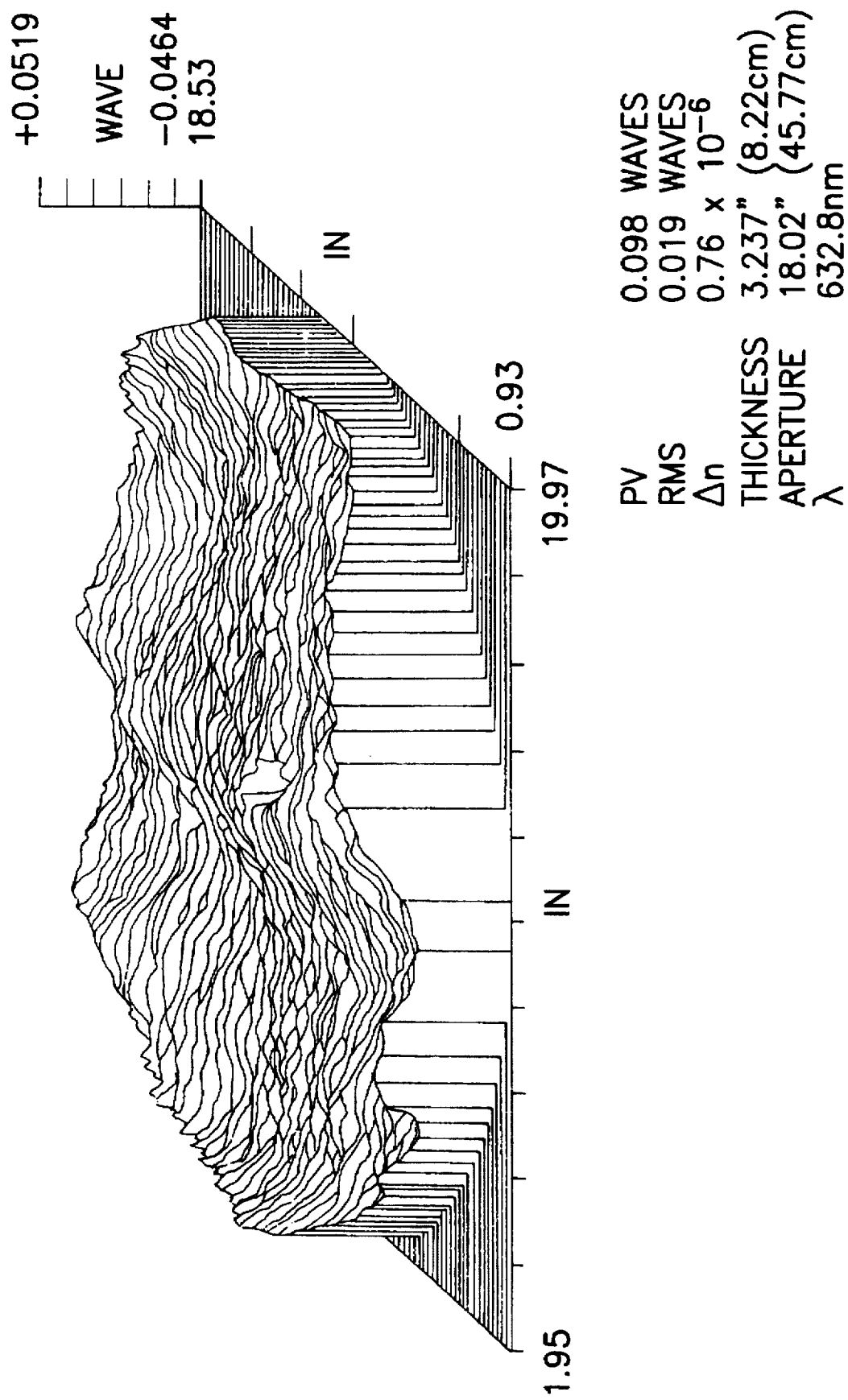
FIG. 2 shows an 18-inch (46 cm) interferometer phase plot for a section of a fused silica boule prepared in accordance with the present invention. The phase plot is taken along the z-axis of the boule.
Figure 6:
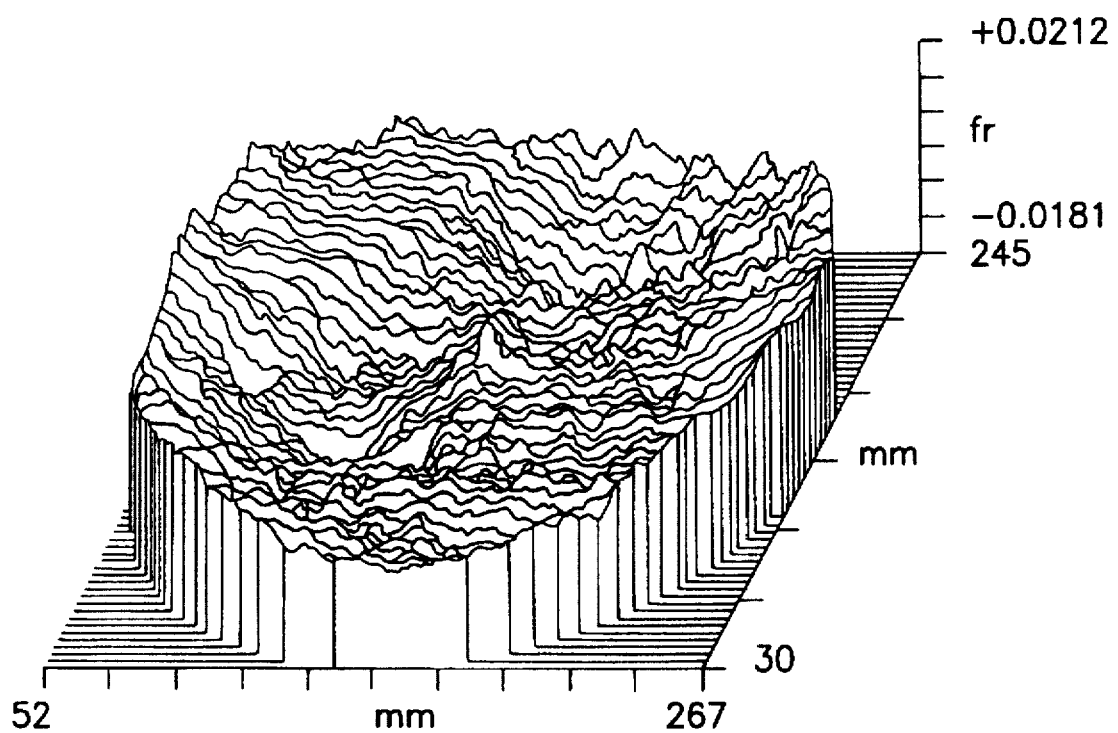
FIG. 6 shows an 8.5-inch (21.5 cm) interferometer phase plot for a fused silica blank prepared in accordance with the present invention. The phase plot is taken along the z-axis of the blank and illustrates the attainment of a $\Delta n$ value of less than $0.25 \times 10^{-6}$ for a blank size greater than 200 millimeters. This plot is in terms of fringes, rather than waves, there being 2 fringes for every wave.

The plots of FIGS. 2 and 6 represent the raw phase plot data minus the PST and TLT components (ZYGO terminology; Zygo Corporation, Middlefield, Conn.).

The foregoing drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention. The drawings of FIGS. 1 and 3–5 are not intended to indicate scale or relative proportions of the elements shown therein. Like reference characters designate like or corresponding parts in the various figures.

DESCRIPTION OF THE PREFERRED EMBODIMENTS

As discussed above, the present invention relates to methods and apparatus for improving the homogeneity of silica-containing bodies made by vapor deposition techniques. The silica-containing body can be substantially pure fused silica or can contain one or more dopants as desired, e.g., the body can contain a titanium dopant which lowers the coefficient of thermal expansion of the glass. Low levels of contaminates may also be present in the body.

Figure 4:
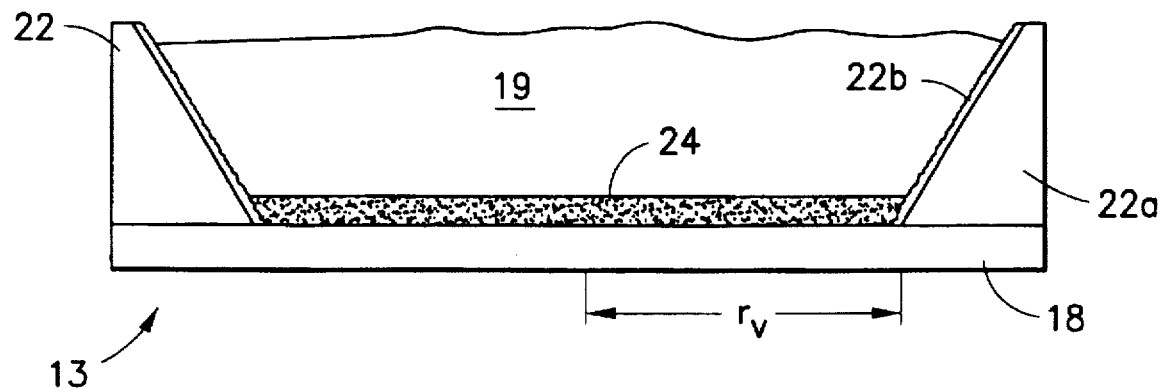
FIG. 4 is a schematic diagram of a containment vessel for producing fused silica boules constructed in accordance with the invention.

With reference to the figures, wherein like reference characters designate like or corresponding parts in the various views, FIG. 4 shows a containment vessel 13 constructed in accordance with the invention. The vessel has a containment wall 22 whose vertical height h increases with increasing distance d from the center of the vessel at a rate $\Delta h/\Delta d$ which is less than or equal to about 3. In particular, as shown in FIG. 4, containment wall 22 is oriented at an angle of 30° with respect to the vertical, so that its $\Delta h/\Delta d$ ratio is about 1.7, i.e., its $\Delta h/\Delta d$ ratio is less than about 2, as is preferred.

The inner surface of containment wall 22 will typically be flat as shown in FIG. 4, although other configurations, e.g., a concave, cup-like configuration, can be used if desired, provided a substantial portion of the glass-contacting surface of the wall satisfies the requirement that $\Delta h/\Delta d$ is less than about 3.

Although not wishing to be bound by any particular theory of operation, it is believed that the use of a containment wall having a $\Delta h/\Delta d$ ratio less than about 3 helps compensate for roll-up effects which occur at the edge of the boule, i.e., effects in which glass deposited at about the same time in the boule formation process tends to be at a higher height near the edge of the boule than at the center, with the differences in height becoming greater as the thickness of the boule increases. This phenomenon is believed to result in decreased homogeneity in the index of refraction of the glass when measured in the z-direction.

The gentle outward slope of the containment vessels of the invention is believed to help compensate for this effect, as well as providing room for greater radial flow and mixing as the boule's thickness increases, which is also believed to be beneficial in reducing the effects of roll-up on homogeneity.

In addition to its gently sloped walls, the containment vessel of FIG. 4 also has a bottom radius $r_v$ which is substantially larger than the radius $r_b$ of the outermost of burners 14 carried by crown 12. Burners 14 are distributed around the crown so as to produce a uniform coverage of the boule surface. The burners can, for example, have radial distances from the center of the crown given by the following equation:

$$r_n = (nA_b/\pi)^{\frac{1}{2}},$$

where n is the burner number, $r_n$ is the radial location of the nth burner, and $A_b$ is the area of the boule covered by an individual burner. A suitable value for $A_b$ is 80 square inches (516 cm²).

In accordance with the invention, $r_v$ is at least about 10% larger than the maximum value of $r_n$, i.e., $r_v$ is at least about 10% larger than $r_b$, so that the boule can undergo mixing as it is formed as a result of radial flow. Preferably, $r_v$ is at least about 135 millimeters larger than $r_b$ so as to provide adequate room for such flow. For an $r_b$ value of about 750 mm, this corresponds to an $r_v$ to $r_b$ ratio of about 1.2.

Prior art containment vessels have had $r_v$ values which were in some cases slightly larger than $r_b$, but not by at least 10% and not by enough to produce improved homogeneity through radial flow. Indeed, in the prior art, boules in many cases overlaid the tops of blocks 22 as a result of $r_v$ being essentially equal to $r_b$. In accordance with the invention, the containment vessel is made large enough so that such overlaying does not occur.

In addition to producing soot particles, burners 14 also serve to heat boule 19 during its formation. In accordance with the invention, the temperature of the boule is maintaining sufficiently high so that the boule will flow radially under its own weight with a minimum of head height. Preferably, the temperature is high enough so that the boule will flow with a head height as small as about 0.125 inches (3.2 mm) of glass or less. Depending upon how the boule is made, e.g., the rate at which it is rotated, centrifugal forces may also play a role in the radial flow.

By means of the invention, significant improvements in homogeneity have been achieved. For example, boules having a diameter of up to 1.53 meters have been manufactured and used to produce blanks having diameters up to 360 millimeters and $\Delta n$ values of less than $0.5 \times 10^{-6}$. Such blanks can be used to produce optical elements for microlithography systems employing, for example, KrF lasers.

Further, as illustrated by the "Ultra High Homogeneity Example" presented below, the invention has also produced boules having a diameter of up to 1.53 meters from which blanks having diameters up to 203 mm (8 inches) and a $\Delta n$ value of less than $0.25 \times 10^{-6}$ have been produced.

Without intending to limit it in any manner, the present invention will be more fully described by the following examples.

Comparative Example

In this experiment, a boule of fused silica was formed using a containment vessel specifically constructed to test the effect on homogeneity of the orientation of the vessel's containment wall with respect to vertical.

Figure 5:
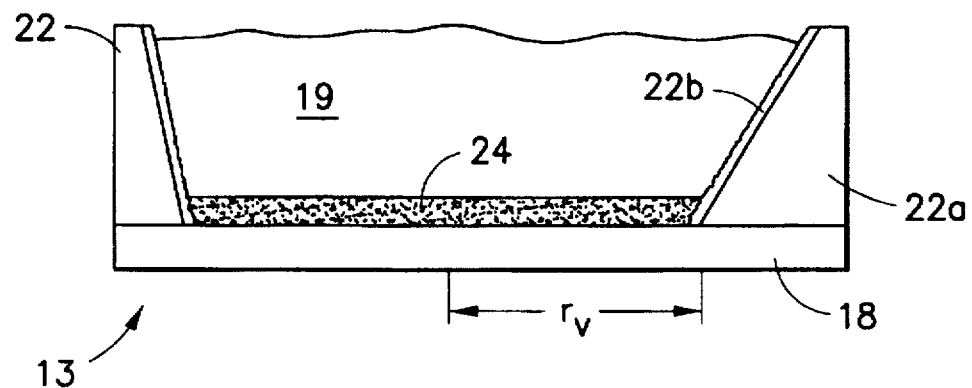
FIG. 5 is a schematic diagram of the containment vessel used to perform the tests of the Comparative Example.

The structure of the test vessel is shown in FIG. 5. As can be seen therein, the bottom inside radius of the vessel was held constant (specifically, at 29 inches (73.7 cm)), but half of the vessel's containment wall used the 10° angle of the prior art, and the other half used a 30° angle in accordance with the invention.

The test vessel was used to produce a 52-inch (132 cm) diameter boule under normal operating conditions. After annealing and grinding, seven samples were taken from different parts of the boule and tested on an 18-inch (46 cm) interferometer. Fiducial marks were used to associate particular samples with the two halves of the boule.

The results of this experiment are shown in Table 1. As shown therein, the boule half made with the larger wall angle had much better index homogeneity than the half made using the prior art angle. In addition, the wavefront was found to exhibit less banding which yields better RMS values. The table also shows that the diameter of blanks that can be extracted from the boule at both the $0.5 \times 10^{-6}$ and $1.0 \times 10^{-6}$ index homogeneity levels was significantly larger on the 30° side of the boule.

Since all other variables which effect index homogeneity were constant, this data clearly demonstrate that the $\Delta h/\Delta d$ values of the two halves of the vessel wall were responsible for the differences in index homogeneity.

Ultra High Homogeneity Example

This example illustrates the production of a fused silica boule from which blanks having a $\Delta n$ value of less than $0.25 \times 10^{-6}$ for a blank size greater than 200 millimeters can be prepared.

Figure 1:
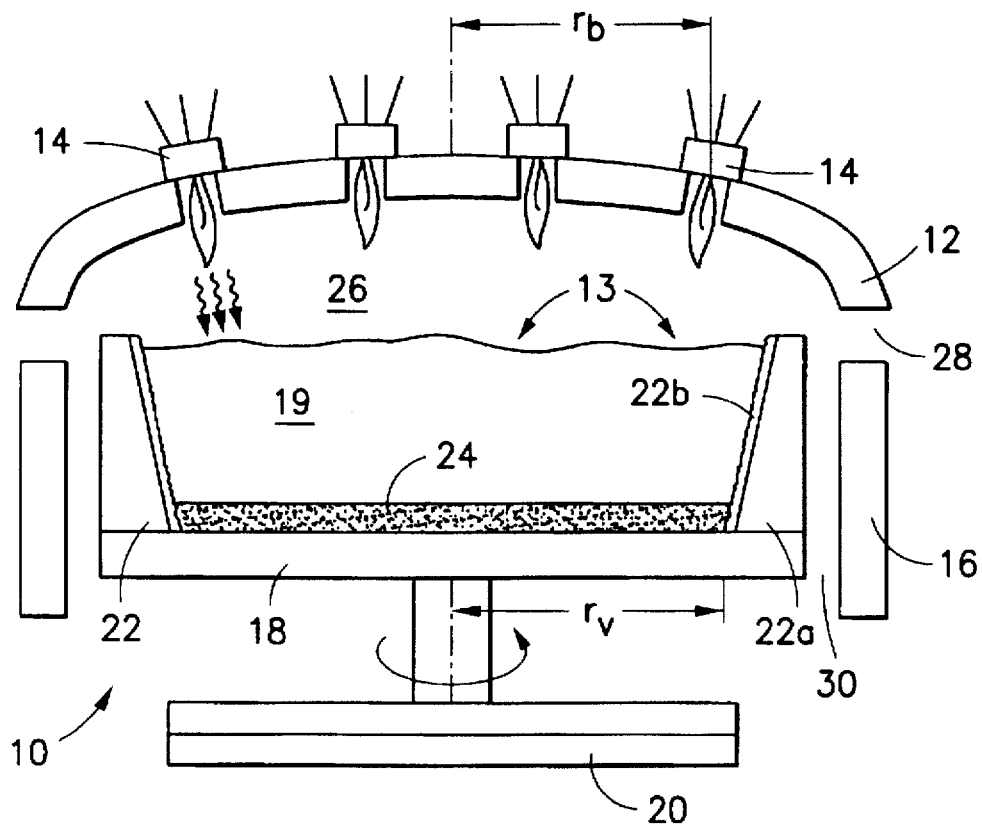
FIG. 1 is a schematic diagram of a prior art furnace used to produce fused silica boules using a flame hydrolysis process.
Figure 3:
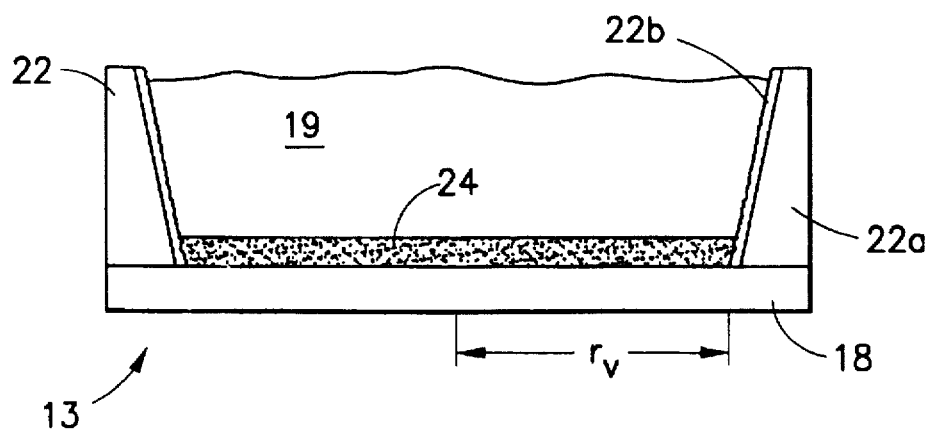
FIG. 3 is a schematic diagram of a prior art containment vessel for producing fused silica boules.

The boule had a diameter of about five feet (1.5 m) and was prepared using a furnace of the type shown in FIG. 1, a containment vessel whose inner walls were sloped at an angle of 30° with respect to vertical, and the processing conditions described above. The oscillation pattern for x-y oscillation table 20 used to produce this boule was given by:

$x(t) = r_1 \sin 2\pi\omega_1 t + r_2 \sin 2\pi\omega_2 t$ $y(t) = r_1 \cos 2\pi\omega_1 t + r_2 \cos 2\pi\omega_2 t$ $r_1 = 1.2$ inches (30.5 mm)

$r_2 = 2.3$ inches (58.4 mm)

$\omega_1 = 5.34$ rpm $\omega_2 = 5.876$ rpm where $x(t)$ and $y(t)$ represent the coordinates of the center of the boule as a function of time (t) and time is measured in minutes. This x-y oscillation pattern was used in combination with an overall boule rotation rate ($\omega_3$) of 4.98 rpm. The pattern tends to produce a relatively high level of off-axis striae as measured by the procedures of commonly assigned U.S. patent application Ser. No. 60/003,607, entitled "Methods for Detecting Striae", which was filed on Sep. 12, 1995 in the names of David R. Fladd and Stephen J. Rieks. For many applications, the presence of off-axis striae does not affect the performance of optical elements composed of fused silica glass. Also, if desired, the level of off-axis striae can be reduced by using the furnace system described in the above-reference application entitled "Furnace for Producing Fused Silica Glass."

FIG. 6 shows an 8.5-inch (21.5 cm) interferometer phase plot for a blank obtained from this boule. The blank had a $\Delta n$ value of less than $0.25 \times 10^{-6}$ for a blank size greater than 200 millimeters.

Although preferred and other embodiments of the invention have been described herein, additional embodiments may be perceived by those skilled in the art without departing from the scope of the invention as defined by the following claims.

TABLE 1

|  | Average Homogeneity 18 inch (46 cm) Aperture | Largest $0.5 \times 10^{-6}$ Aperture | Largest $1.0 \times 10^{-6}$ Aperture |
| --- | --- | --- | --- |
| 10° Wall | $6.6 \times 10^{-6}$ | 8.9 inches (22.6 cm) | 12.0 inches (30.5 cm) |
| 30° Wall | $3.0 \times 10^{-6}$ | 10.8 inches (27.4 cm) | 15.8 inches (40.1 cm) |

What is claimed is:

1. A method for forming a silica-containing body, said body having a center and said method comprising:

(a) providing soot particles;

(b) collecting the soot particles to form the body; and (c) causing the body to undergo mixing as it is formed as a result of flow in a radial direction relative to said center so that a blank formed from the body has a homogeneity which is less than or equal to $1.0 \times 10^{-6}$ for a blank size greater than or equal to 125 millimeters.

2. The method of claim 1 wherein the body undergoes sufficient mixing so that a blank formed from the body has a homogeneity which is less than or equal to $1.0 \times 10^{-6}$ for a blank size greater than or equal to 150 millimeters.

3. The method of claim 1 wherein the body undergoes sufficient mixing so that a blank formed from the body has a homogeneity which is less than or equal to $1.0 \times 10^{-6}$ for a blank size greater than or equal to 200 millimeters.

4. The method of claim 1 wherein the body undergoes sufficient mixing so that a blank formed from the body has a homogeneity which is less than or equal to $0.5 \times 10^{-6}$ for a blank size greater than or equal to 125 millimeters.

5. The method of claim 1 wherein the body undergoes sufficient mixing so that a blank formed from the body has a homogeneity which is less than or equal to $0.5 \times 10^{-6}$ for a blank size greater than or equal to 150 millimeters.

6. The method of claim 1 wherein the body undergoes sufficient mixing so that a blank formed from the body has a homogeneity which is less than or equal to $0.5 \times 10^{-6}$ for a blank size greater than or equal to 200 millimeters.

7. The method of claim 1 wherein the body undergoes sufficient mixing so that a blank formed from the body has a homogeneity which is less than or equal to $0.25 \times 10^{-6}$ for a blank size greater than or equal to 125 millimeters.

8. The method of claim 1 wherein the body undergoes sufficient mixing so that a blank formed from the body has a homogeneity which is less than or equal to $0.25 \times 10^{-6}$ for a blank size greater than or equal to 150 millimeters.

9. The method of claim 1 wherein the body undergoes sufficient mixing so that a blank formed from the body has a homogeneity which is less than or equal to $0.25 \times 10^{-6}$ for a blank size greater than or equal to 200 millimeters.

10. The method of claim 1 wherein step (c) comprises maintaining the body at a temperature which is sufficiently high so that the body flows radially under its own weight at a head height less than or equal to about 5.0 millimeters of glass.

11. The method of claim 10 wherein the temperature is sufficiently high so that the body flows radially under its own weight at a head height less than or equal to about 3.2 millimeters of glass.

12. The method of claim 1 wherein the soot particles are collected in a containment vessel which has a center and which comprises at least one containment wall which contacts the body as the body is formed, the vertical height of said wall increasing with increasing distance from the center of the vessel at a rate which is less than or equal to about 3.

13. The method of claim 12 wherein the rate is less than or equal to about 2.

14. The method of claim 1 wherein:

the soot particles are provided by a plurality of burners, said plurality of burners having a center and the outermost of said burners being at a radius $r_b$ from said center;

the soot particles are collected in a containment vessel having a bottom and at least one containment wall, the distance between the innermost point of the containment wall and the bottom's center being $r_v$; and the ratio of $r_v$ to $r_b$ is at least about 1.1.

15. The method of claim 14 wherein the difference between $r_v$ and $r_b$ is greater than or equal to about 135 millimeters.

16. The method of claim 14 wherein:

the at least one containment wall contacts the body as the body is formed, and the vertical height of the wall increases with increasing distance from the bottom's center at a rate which is less than or equal to about 3.

17. The method of claim 14 wherein step (c) comprises maintaining the body at a temperature which is sufficiently high so that the body flows radially under its own weight at a head height less than or equal to about 5.0 millimeters of glass.

18. The method of claim 16 wherein step (c) comprises maintaining the body at a temperature which is sufficiently high so that the body flows radially under its own weight at a head height less than or equal to about 5.0 millimeters of glass.

19. A blank made from a silica-containing body made by the method of claim 1 wherein the blank has a homogeneity which is less than or equal to $0.25 \times 10^{-6}$ for a blank size greater than or equal to 125 millimeters.

20. The blank of claim 19 wherein the blank contains a dopant.

21. An optical element made from the blank of claim 19.

22. A containment vessel for use in forming a silica-containing body, said vessel comprising a bottom which is covered with bait sand and at least one containment wall which contacts the body as the body is formed, the vertical height of said wall increasing with increasing distance from the center of the vessel at a rate which is less than or equal to about 3.

23. The containment vessel of claim 22 wherein the rate is less than or equal to about 2.

24. A furnace for forming a silica-containing body comprising:

(a) a plurality of burners for producing soot particles, said plurality of burners having a center and the outermost of said burners being at a radius $r_b$ from said center; and (b) a containment vessel for collecting the soot particles to form the body, said vessel having a bottom and at least one containment wall, said bottom having a center and being covered with bait sand, the distance between the bottom's center and the innermost point of the containment wall being $r_v$;

wherein $r_v$ is greater than $r_b$ by an amount which allows the body to undergo mixing as it is formed as a result of radial flow, the ratio of $r_v$ to $r_b$ being at least about 1.1.

25. The furnace of claim 24 wherein the difference between $r_v$ and $r_b$ is greater than or equal to about 135 millimeters.

26. The furnace of claim 24 wherein:

the at least one containment wall contacts the body as the body is formed, and the vertical height of said wall increases with increasing distance from the bottom's center at a rate which is less than or equal to about 3.

27. A fused silica blank which has a homogeneity which is less than or equal to $0.25 \times 10^{-6}$ for a blank size greater than or equal to 125 millimeters.

28. The fused silica blank of claim 27 wherein the blank size is greater than or equal to 150 millimeters.

29. The fused silica blank of claim 37 wherein the blank size is greater than or equal to 200 millimeters.

30. An optical element made from the blank of claim 27.

* * * * *